United States Patent
Sali et al.

(10) Patent No.: US 6,215,895 B1
(45) Date of Patent: *Apr. 10, 2001

(54) APPARATUS AND METHOD FOR DISPLAY PANEL INSPECTION

(75) Inventors: Erez Sali, Yehud; Yigal Katzir, Rishon Lezion; Noam Dotan, Givatayim; Abraham Gross, Rehovot, all of (IL)

(73) Assignee: Orbotech Ltd., Yavne (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/099,494

(22) Filed: Jun. 18, 1998

Related U.S. Application Data

(63) Continuation of application No. 08/402,141, filed on Mar. 10, 1995, now Pat. No. 5,771,068.

(30) Foreign Application Priority Data

Mar. 14, 1994 (IL) ........................................................ 108.974

(51) Int. Cl.$^7$ ....................................................... G06K 9/00
(52) U.S. Cl. ............................................. 382/141; 348/92
(58) Field of Search .................................. 202/141, 149; 348/92, 189–191; 345/28, 44; 256/237; 259/90

(56) References Cited

U.S. PATENT DOCUMENTS

| | | | |
|---|---|---|---|
| 4,796,090 | 1/1989 | Fraiser | 348/147 |
| 5,012,314 | 4/1991 | Tobita et al. | 357/23.12 |
| 5,020,116 | 5/1991 | Macaulay | 348/190 |
| 5,081,687 | 1/1992 | Henley et al. | 382/8 |
| 5,177,437 | 1/1993 | Henly | 324/158 |
| 5,235,272 | 8/1993 | Henley | 445/904 |
| 5,245,328 | 9/1993 | Garrett | 345/149 |
| 5,402,170 | 3/1995 | Parulski et al. | 348/211 |
| 5,771,068 | * 6/1998 | Sali et al. | 348/92 |

FOREIGN PATENT DOCUMENTS

| | | |
|---|---|---|
| 0482564 | 4/1992 | (EP) . |
| 4133088 | 5/1992 | (JP) . |
| 9319453 | 9/1993 | (WO) . |

OTHER PUBLICATIONS

Patent Abstracts of Japan of JP4133088 dated May 1992.
Patent Abstracts of Japan of JP6250139 dated Sep. 1994.
Patent Abstracts of Japan of JP6236162 dated Aug. 1994.
Patent Abstracts of Japan of JP6230744 dated Aug. 1994.
O'Shea, Connie, et al. "Automatic Quality Control Inspection of Liquid Crystal Displays." SPIE, vol. 2064 (1993) pp. 289–299.
Kelly, S. "Removing the pixel structure from projected images using a transparent spatial filter." SPIE, vol. 1664 (1992), pp. 153–159.
Cummins, R., et al. "Evaluating Image Quality and Defect Characterization in Flat–Panel Displays." from Photon Dynamics Inc.
"FIS Flat Panel Inspection System" Brochure published by Photon Dynamics, Inc.
"Replace Human Eyes with the in–line A01 for Final–Cell Stage." from Reference Nikkei Microdevices (1994).

* cited by examiner

*Primary Examiner*—Joseph Mancuso
(74) *Attorney, Agent, or Firm*—Ladas & Parry

(57) ABSTRACT

A system for inspecting a display panel including a plurality of pixels, the system including a selective pixel actuator which causes only some of the plurality of pixels to be actuated, a sensor for acquiring an image of a pattern which is generated on the panel, and an image processor operative to identify nonuniformities in the intensities of pixels of the panel.

12 Claims, 5 Drawing Sheets

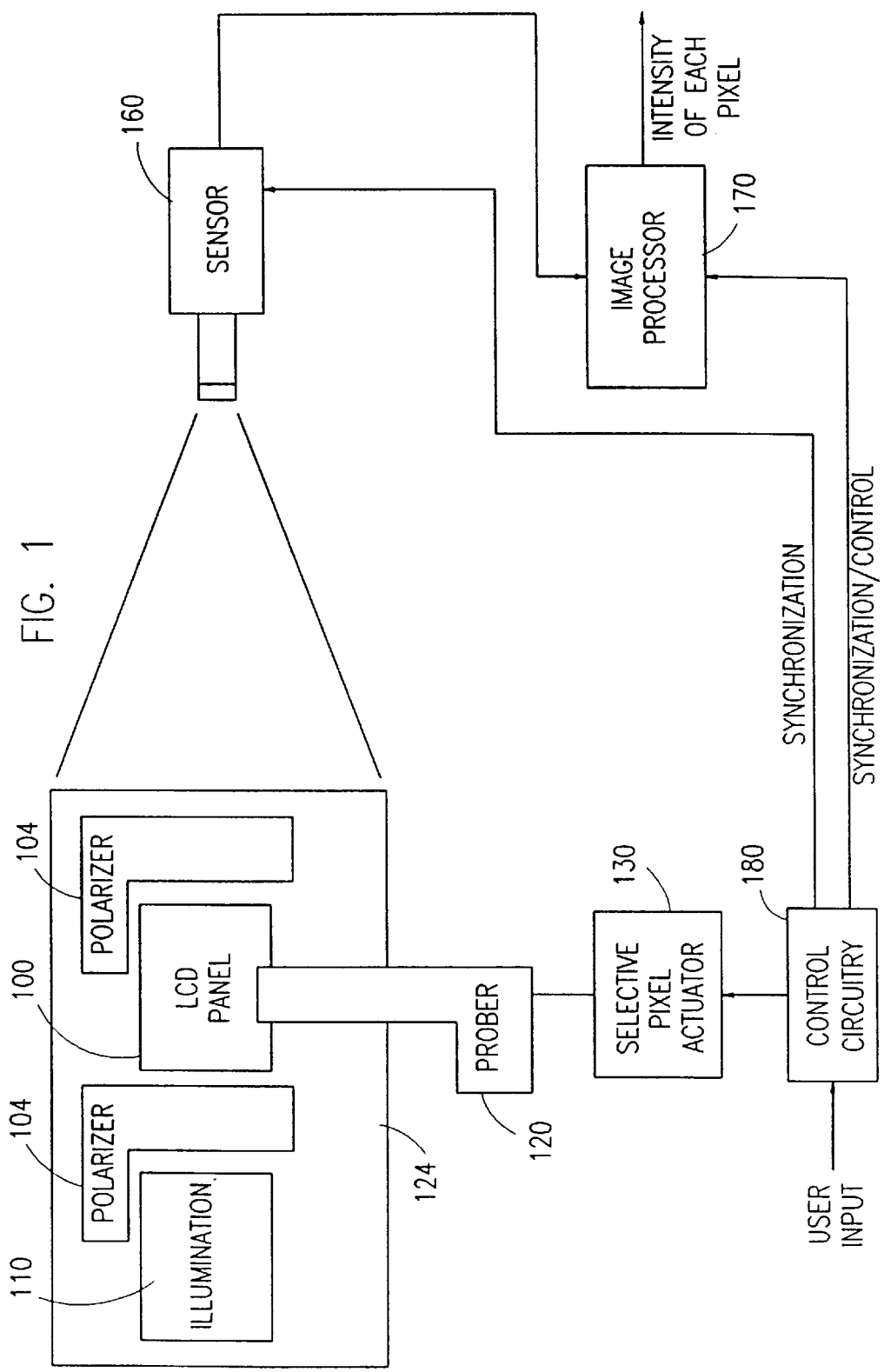

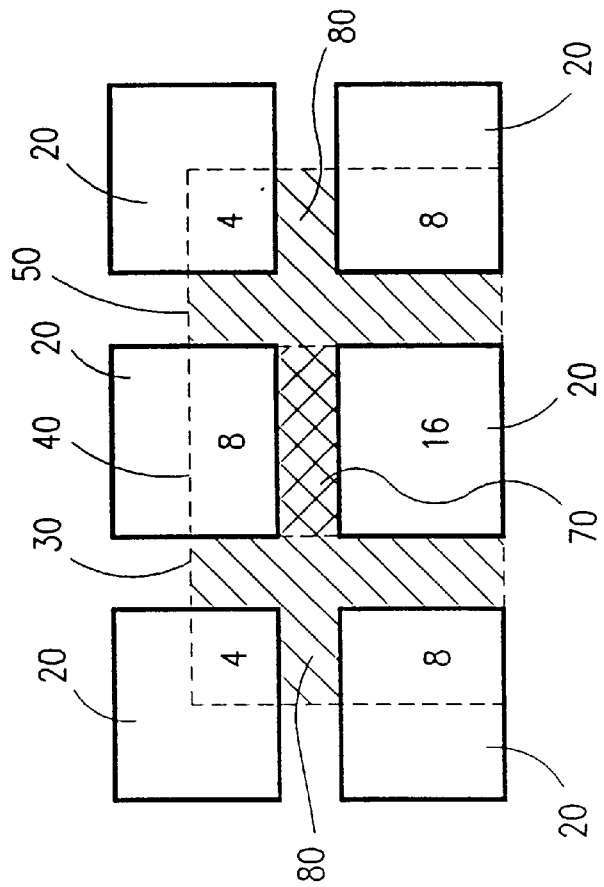
FIG. BA-2
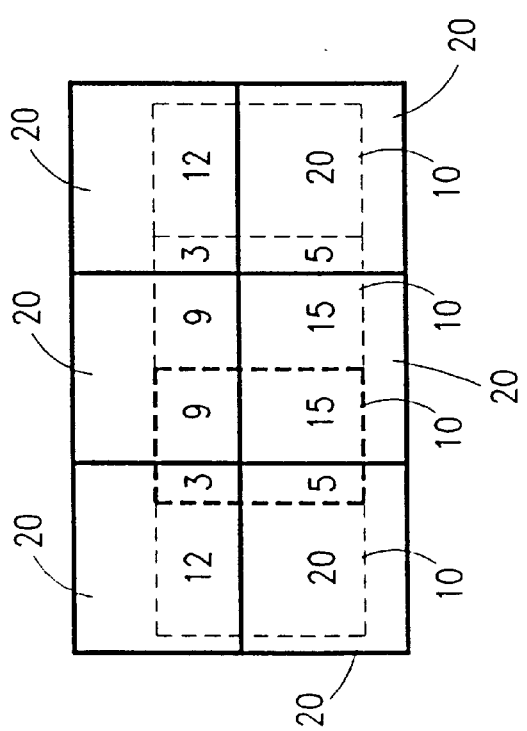
FIG. BA-1

APPARATUS AND METHOD FOR DISPLAY PANEL INSPECTION

This application is a continuation of application Ser. No. 08/402,141 filed Mar. 10, 1995, now U.S. Pat. No. 5,771,068, which is incorporated herein. The appendices referenced to herein can be found in this parent application, U.S. Pat. No. 5,771,068.

FIELD OF THE INVENTION

The present invention relates to display panel inspection.

BACKGROUND OF THE INVENTION

Conventional systems for inspecting display panels include the system described in Cummins, R. et al, "Evaluating image quality and defect characterization in flat panel display", Photon Dynamics, Inc., 1504 McCarthy Blvd., Milpitas, Calif., USA.

In conventional display panel inspection, an image of a display panel, including a multiplicity of pixels, is imaged by a sensor which is also pixelated, the pixels of the sensor normally not being contiguous (i.e., having a fill factor of less than 100%) and normally not being equally sized nor perfectly aligned relative to the pixels of the display panel image.

FIG. BA-1 is a diagram of a display panel image including, for simplicity, four display panel pixels 10 which are imaged by a sensor including, for simplicity, six sensing elements 20. The sensor is ideal, i.e. theoretical, in the sense that the sensor elements thereof are contiguous. Typically, nonuniform display panel intensity shows up as a local variation in the video signal of the sensors. The numbers within the display panel pixels 10 indicate the proportion of the total area of the display panel pixel that is sensed by the respective camera pixel, in arbitrary units.

FIG. BA-2 is a diagram of a display panel image which is not ideal in that the sensor elements 20 are not contiguous. In FIG. BA-2, for simplicity, three display panel pixels 30, 40 and 50 are shown. The portion of display panel pixel 40 which is not sensed, as indicated by cross-hatching 70 is smaller than the portions of display panels 30 and 50, as indicated by diagonal lines 80. This results in inaccuracies in measuring the intensities of the display panel pixels. Specifically, local variation in the video signal of the sensors does not necessarily indicate nonuniform display panel intensity.

SUMMARY OF THE INVENTION

The present invention seeks to provide an improved system for display panel inspection.

There is thus provided in accordance with a preferred embodiment of the present invention a system for inspecting a display panel including a plurality of pixels, the system including a selective pixel actuator which causes only some of the plurality of pixels to be actuated, a sensor for acquiring an image of a pattern which is generated on the panel, and an image processor operative to identify nonuniformities in the intensities of pixels of the panel.

Further in accordance with a preferred embodiment of the present invention the display panel includes an LCD (liquid crystal display) panel, and the system also includes an illuminator operative to provide illumination to a panel to be inspected.

Still further in accordance with a preferred embodiment of the present invention the illumination of the panel to be inspected includes back illumination and actuation of pixels includes changing the local transmittance thereof.

Additionally in accordance with a preferred embodiment of the present invention the selective pixel actuator is operative to sequentially actuate a sequence of pixel subsets, and each pixel subset includes only a single pixel within each of a plurality of pixel vicinities of predetermined size within the display panel.

There is further provided in accordance with a preferred embodiment of the present invention a system for inspecting a display panel including a plurality of pixels, the system including a sensor for simultaneously acquiring an image of substantially the entirety of a pattern which is generated on the panel, and an image processor operative to identify nonuniformities in the intensities of pixels of the panel.

There is additionally provided in accordance with a preferred embodiment of the present invention a method for inspecting a display panel including a plurality of pixels, the method including actuating only some of the plurality of pixels, acquiring an image of a pattern which is generated on the panel, and identifying nonuniformities in the intensities of pixels of the panel.

There is further provided in accordance with a preferred embodiment of the present invention a system for inspecting a display panel including a plurality of pixels, the system including a sensor for acquiring an image of a pattern which is generated on the panel at a resolution which does not substantially exceed that of a standard TV camera, and an image processor operative to identify nonuniformities in the intensities of pixels of the panel.

Further in accordance with a preferred embodiment of the present invention the sensor includes less than 1300×1000 sensing elements.

Still further in accordance with a preferred embodiment of the present invention the sensor includes no more than 800×500 sensing elements.

There is additionally provided in accordance with a preferred embodiment of the present invention a system for inspecting a display panel including a plurality of pixels, the system including a sensor for acquiring an image of a pattern which is generated on the panel, and an image processor operative to identify the intensity of each pixel of the panel.

Further in accordance with a preferred embodiment of the present invention the display panel includes a liquid crystal display (LCD) panel.

Still further in accordance with a preferred embodiment of the present invention the display panel includes an LCD cell without illumination, driver or polarizer.

Additionally in accordance with a preferred embodiment of the present invention the system also includes a fixture for holding the panel to be inspected.

There is also provided in accordance with a preferred embodiment of the present invention a method for inspecting a display panel including a plurality of pixels, the method including simultaneously acquiring an image of substantially the entirety of a pattern which is generated on the panel, and identifying nonuniformities in the intensities of pixels of the panel.

There is further provided in accordance with a preferred embodiment of the present invention a method for inspecting a display panel including a plurality of pixels, the method including acquiring an image of a pattern which is generated on the panel at a resolution which does not substantially exceed that of a standard TV camera, and identifying nonuniformities in the intensities of pixels of the panel.

Still further provided in accordance with a preferred embodiment of the present invention is a method for inspecting a display panel including a plurality of pixels, the method including acquiring an image of a pattern which is generated on the panel, and identifying the intensity of each pixel of the panel.

BRIEF DESCRIPTION OF THE DRAWINGS

The present invention will be understood and appreciated from the following detailed description, taken in conjunction with the drawings in which:

FIG. BA-1 is a diagram of a display panel image which is ideal in that the sensor elements are contiguous;

Figure 2:
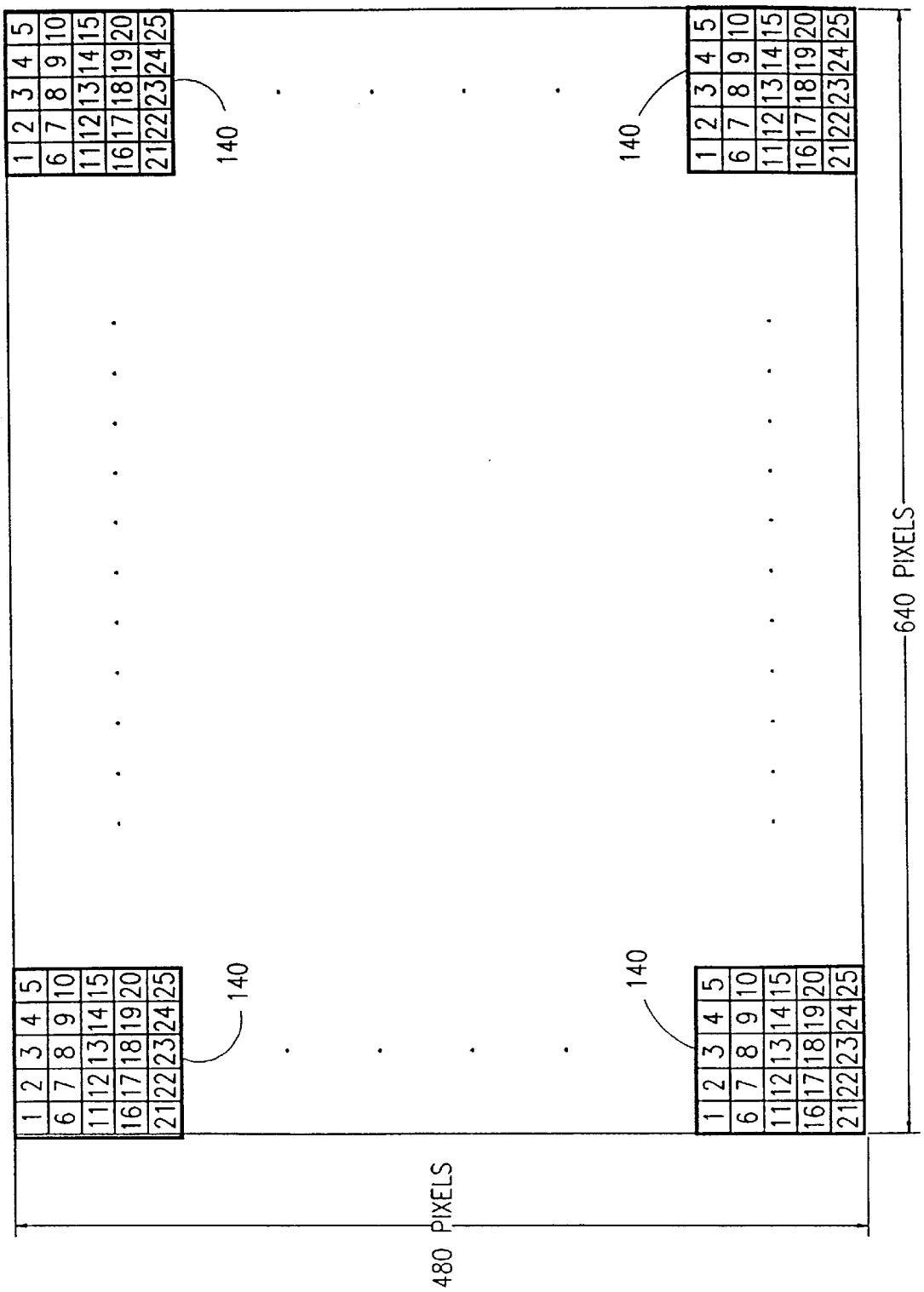
Figure 3:
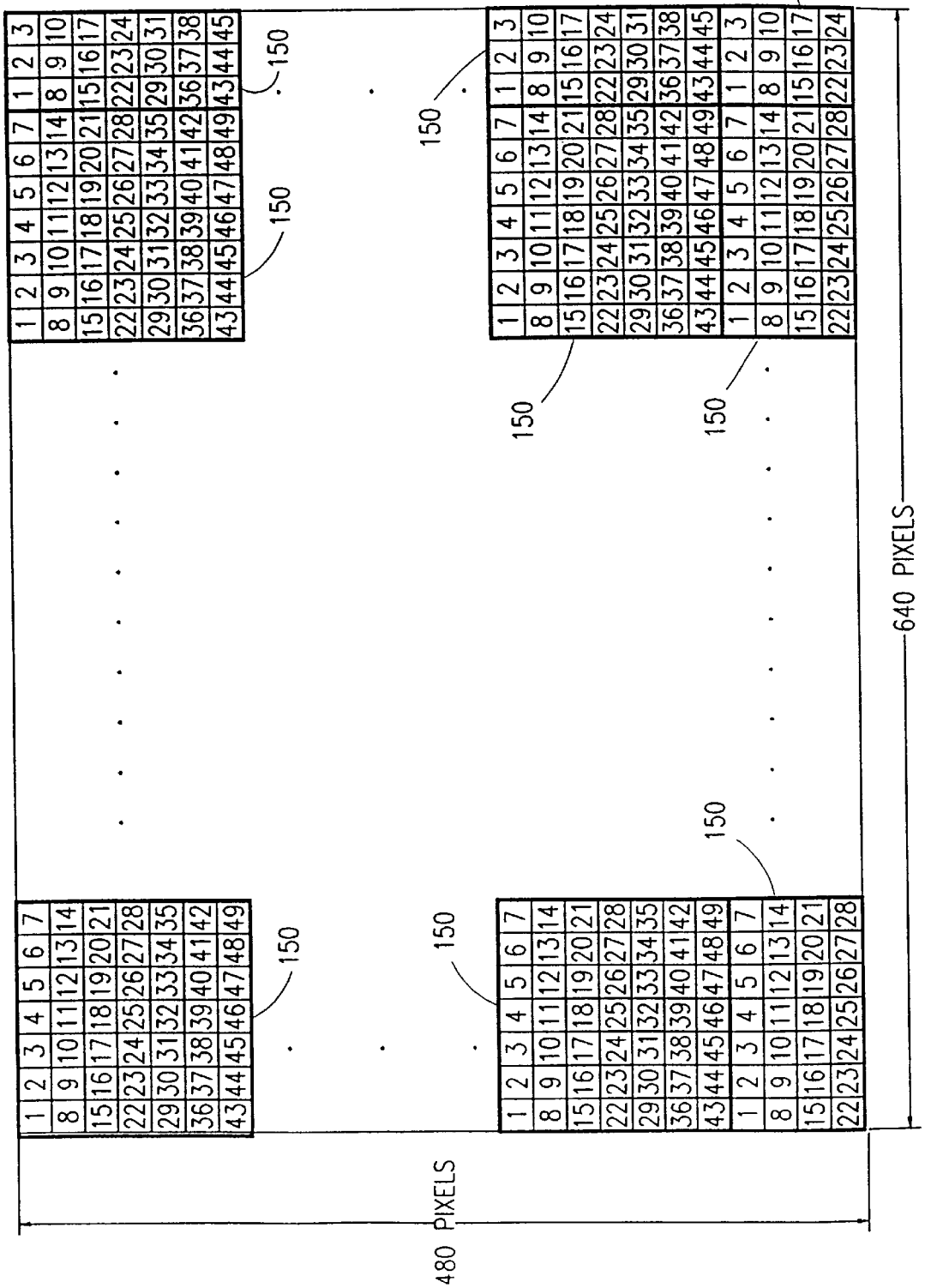
Figure 4:
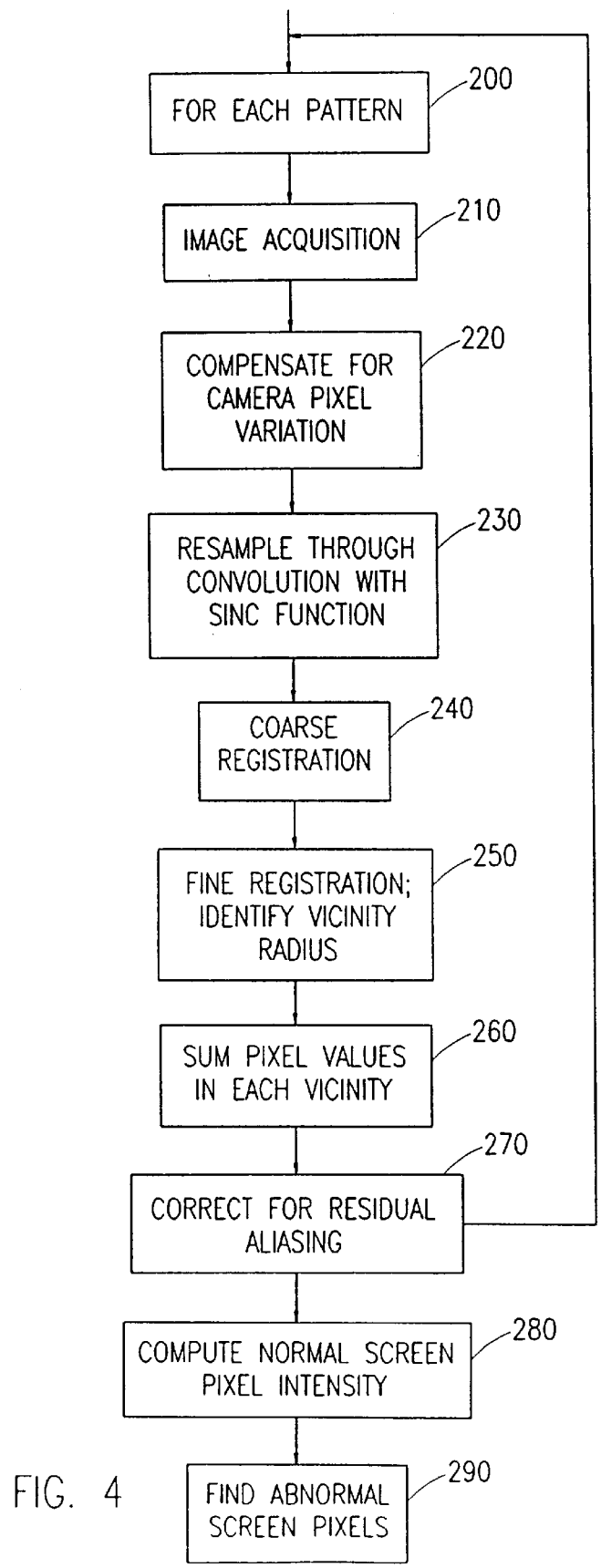

FIG. BA-2 is a diagram of a display panel image which is not ideal in that the sensor elements are not contiguous;

FIG. 1 is a functional block diagram of a display panel inspection system inspecting an LCD cell;

FIG. 2 is a diagram of one possible display panel pixel actuation ordering based on vicinities of 5×5 pixels each;

FIG. 3 is a diagram of another possible display panel pixel actuation ordering based on vicinities of 7×7 pixels each; and FIG. 4 is a simplified flowchart of a preferred image processing method for identifying the intensity of each pixel of the inspected display panel which is suitable for implementing the image processor of FIG. 1.

DETAILED DESCRIPTION OF PREFERRED EMBODIMENTS

Reference is now made to FIG. 1 which is a functional block diagram of a display panel inspection system inspecting an LCD cell 100.

Since the unit under inspection is an LCD cell, polarizers 104 are provided as well as back illumination 110 and a prober 120 which is operative to provide electrical contacts with the inspected panel 100. A suitable fixture 124 maintains the LCD panel 100, polarizers 104 and illuminator 110 in mutually fixed association.

It is appreciated that substantially the same system may be employed to inspect an LCD module and/or a light emitting display panel. If an LCD module is inspected, the polarizers 104, back illumination 110 and prober 120 may be eliminated.

In the present specification, "LCD cell" is used to refer to a display panel without backlight, driver or polarizer whereas "LCD module" is used to refer to a fully assembled display panel.

The prober 120 is operative to provide electrical communication between LCD panel 100 and a selective pixel actuator 130. The selective pixel actuator 130 is operative to cause only some of the plurality of pixels which together form the display panel 100, to be actuated at one time. For LCD panels, actuation of pixels comprises changing of the local transmittance thereof. For light emitting panels, actuation of pixels comprises changing the amount of light emitted by the pixels.

Preferably, the selective pixel actuator 130 is operative to sequentially actuate a sequence of pixel subsets, wherein each pixel subset includes only a single pixel within each of a plurality of pixel vicinities of predetermined size within the display panel.

The simplest selective pixel actuation scheme is one in which, when a particular pixel is illuminated, none of its 8-connected neighbors are illuminated. Other pixel actuation schemes based on more complex pixel actuation orderings are illustrated in FIGS. 2 and 3.

FIG. 2 is a diagram of a display panel pixel actuation ordering which is based on vicinities, referenced 140, of 5×5 pixels each. The ordering of the pixels as 1, 2, . . . , 25 means that the sequence of actuation thereof is as follows:

STEP 1: All pixels marked "1" are activated, thereby generating a first pattern on the screen;

STEP 2: All pixels marked "2" are activated, thereby generating a second pattern on the screen;

STEP 25: All pixels marked "25" are activated, thereby generating a twenty-fifth pattern on the screen.

FIG. 3 is a diagram of another display panel pixel actuation ordering which is based on vicinities, referenced 150, of 7×7 pixels each. The ordering of the pixels as 1, 2, . . . , 49 means that the sequence of actuation thereof is as follows:

STEP 1: All pixels marked "1" are activated;

STEP 2: All pixels marked "2" are activated;

STEP 49: All pixels marked "49" are activated.

This ordering results in the sequential generation of 49 different patterns on the screen.

The size of each vicinity is typically selected as a compromise between the following two conflicting considerations: a. A large vicinity makes the system more accurate; and b. A small vicinity makes the system quicker because less steps are required in order to sequentially inspect all pixels within the vicinity.

The area of the vicinity generally depends on the point spread function of the system, i.e. the extent to which the image of the display pixels captured by the system's sensor is blurred.

Preferably, the sequence of 25 or 49 patterns is preceded by a registration pattern which is employed not to determine the intensities of the screen pixels participating in any particular pattern but rather to determine the registration of all patterns in the sequence, relative to the pixels of sensor 160. Typically, the registration pattern comprises four screen pixels disposed adjacent the four corners of the screen.

The time interval between switching off of a pattern n and switching on of a pattern n+1 in each sequence and between the instant at which image acquisition of pattern n+1 can begin depends on the rise time and fall time characterizing the particular display technology. For example, for the active matrix LCD installed in the IBM ThinkPad 750C, acquisition may begin when the later of the following two events occurs:

a. The previous pattern n, has decayed sufficiently, e.g. to below 2% of its "on" intensity; and b. The current pattern n+1 has risen sufficiently, i.e. to above 98% of its "on" intensity.

The rise and fall times can be measured by a suitable photodetector such as a PMT (photomultiplier tube).

Preferably, predetermined blurring of the pattern is introduced in the image acquired by the system's sensor, in order to increase accuracy by allowing more sensing elements to participate in a local sensing task. Blurring may be achieved by means of a mechanical displacing unit which may be operative to vibrate or otherwise displace the display panel, and/or the sensor and/or an optical element such as a prism or mirror interposed between the display panel and the sensor. Alternatively or in addition, blurring may be achieved optically, as by means of a blurring filter on the camera.

Referring back to FIG. 1, the system includes a sensor 160 such as a Cohu 4110 digital camera (commercially available from Cohu, San Diego, Calif., USA) equipped with a 25 mm lens. The lens is selected so as to simultaneously acquire an image of substantially the entire pattern generated on the panel, i.e. the entire area of the display panel 100, or almost the entire area thereof, is simultaneously imaged by the sensor 160.

The lens focal length is preferably selected such that a display panel having a typical diagonal of 10 inches is viewed at a distance of nearly 90 cm. This selection minimizes variation of display pixel intensity due to observation angle.

The resolution at which the sensor 160 acquires the image preferably does not substantially exceed that of a standard TV camera. The sensor preferably comprises less than 1300×1000 sensing elements, or even less than 800×500 sensing elements. For example, the Cohu camera includes 739×484 active sensing elements.

The digital video signal generated by the sensor 160, typically having a width of 8 bits, is fed to an image processor 170. Control circuitry 180 is operative to accept user input commands and programs and to control all system components. Control circuitry 180 and image processor 170 may, if desired, be implemented within a single unit such as a SPARC 10 workstation, commercially available from Sun Microsystems, Mountain View, Calif., USA, in conjunction with a MAX VIDEO 20 image processor, commercially available from Datacube, Danvers, Mass., USA.

FIG. 4 is a simplified flowchart of a preferred method of operation for the image processor 170 of FIG. 1. The method of FIG. 4 is preferably operative to identify the intensity of each pixel of the inspected display panel by processing each pattern generated on the display panel and comparing the different patterns generated on the display panel.

The method of FIG. 4 preferably includes the following steps:

a. STEP 200: Steps 210 to 270 are performed for each of the patterns generated on the display panel, such as 25 patterns or 49 patterns.

b. STEP 210: Receive the current pattern in digitized form from the sensor 160. To improve the signal-to-noise ratio, it is preferable to integrate the pattern's signal over several video frames, such as four video frames.

c. STEP 220: Compensate for performance variations among the camera pixels, for example by subtracting from each camera pixel value its offset value and subsequently multiplying each subtracted pixel value by its gain coefficient.

Preferably, the operational stage of the apparatus of FIG. 1 is preceded by a camera learning stage in which the offset values and gain coefficients are determined for each of the camera pixels.

d. STEP 230: The gray level image of the screen pattern is resampled through convolution with a sinc function, thereby to generate a new pattern whose resolution is typically greater than that of the original pattern. For example, the resolution may be increased fourfold. Resampling through convolution with a sinc function, which is particularly useful in overcoming aliasing, is a known procedure which is described, for example, in W. H. Press et al, *Numerical Recipes in C*, Cambridge University Press, 1988, pp. 403–407.

STEP 240: A coarse registration between the resampled, increased resolution camera image and the current pattern, whose characteristics are known, is determined. The coarse registration is determined by inspecting the registration pattern in order to identify the magnification of the imaging process and the orientation of the pattern relative to the camera.

STEP 250: A fine registration between the resampled, increased resolution camera image and the current pattern is now determined. The approximate location of each display pixel's image within the resampled camera image is known from the coarse registration of step 240. The vicinity of each approximate location is now searched to find a local maximum intensity which is identified as the center of the image of the current display pixel. Preferably, the average distance between adjacent display pixel centers is computed.

STEP 260: Sum the resampled pixel values falling within a vicinity of the current display pixel image center. For example, the image processor may sum all resampled pixel values falling within a circle whose radius is approximately equal to half the average distance between adjacent display pixel centers.

STEP 270: Correct for residual aliasing and store the resulting plurality of numerical values as the intensities for the corresponding plurality of screen pixels included in the current pattern. Aliasing gives rise to a periodic modulation of the sums of the pattern dot intensities which is known in the art as a moire pattern.

A preferred method for correcting for residual aliasing includes the following steps:

a. Compute the period and orientation of the moire pattern based on the coarse registration information computed in step 240 and on the known period of the display panel pixels. A preferred method for performing the moire period and orientation computation is described in J. Krumm et al, *Sampled-grating and crossed-grating models of moire patterns from digital imaging*, Optical Engineering, vol. 30, no. 2, February 1991, pp. 195–206.

b. Sum the two-dimensional dot pattern intensities along a direction perpendicular to the wave vector of the moire pattern, i.e. along the moire "wavefronts". Normalize by dividing each resulting sum by the number of addends which were added to obtain the sum.

c. Use the normalized sum vector computed in step b to compute a correction factor. The correction factor is typically:

$$1 - \frac{S_i - A}{S_i},$$

where:

$S_i$ = the $i$'th component of the normalized sum vector; and $A$ = the average of all components in the normalized sum vector.

A software implementation of a preferred method for correcting for residual aliasing is described in the listing entitled DEMO.c which is appended hereto as Appendix F. The routine which performs the method is entitled FIX_RESULTS.

STEP 280: Once a numerical value has been stored for each screen pixel, compute a central tendency of the numerical values, such as an average of the numerical values, thereby to define a "normal" intensity for the screen pixels.

STEP 290: Identify screen pixels whose intensities are other than "normal" and generate an output indication of these screen pixels.

It is appreciated that the patterns shown and described herein are merely exemplary of a general class of pattern sequences in which only a single pixel within a certain vicinity is actuated in any single pattern. All pixels within each vicinity are actuated, but only one at a time.

Appendix A is a computer listing of a preferred program which runs on a Sun SPARC 10 workstation, commercially available from Sun Microsystems, Mountain View, Calif., USA, with an Open Windows 3.0 environment, and with the Pixrect libraries and the software of Datacube's Max-Video20 image processor, commercially available from Datacube, Danvers, Mass., USA installed on a hard disk. The hardware of the MaxVideo20 is installed on the SPARC workstation bus and connected to the camera 160. Also used as a library are the object files of W. H. Press et al, *Numerical Recipes* in C. GCC and ACC are used as compilers.

The program of Appendix A performs the functions of FIG. 4.

Appendices B—O are subroutines, termed GRAB_GLOBALS, GRAB_PACKAGE, GRABCENTER, REMOTE, DEMO, RESAMPLE, CC_LINK, SCAN_FILES, SCAN_IF, SCAN_TEXT, OPTIONS, PIC_IO, GRAB and IMIO, respectively, which are called by the program of the executable file generated by the makefile of Appendix A.

Appendix P is a computer listing of a preferred software implementation of selective pixel actuator 130 of FIG. A preferred method of utilizing the above Appendices in the above described environment to obtain a PC display panel inspection system constructed and operative in accordance with a preferred embodiment of the present invention, including the following steps:

a. Type in the files of Appendices A to P using a VI editor.

b. Compile the files of Appendices A to O, using the makefile of Appendix A.

c. To inspect the display panel of a PC such as an IBM ThinkPad 750C, compile Appendix P on the PC, using the Borland Turbo C compiler.

d. Connect the RS232 output of the PC and the Sun SPARC workstation using a conventional cable.

e. On the PC, type: FPD 1
On the SPARC workstation, type: DEMO

The SPARC workstation will then load a first pattern onto the PC. Processing of the first pattern is described in steps f onward.

f. Open the option menu presented by the DEMO on the SPARC and adjust the following parameters: The spacing between the dots on the PC, the number of dots along the horizontal axis and the number of dots along the vertical axis.

g. To performs steps 210 and 230 of FIG. 4, press the GRAB button in order to grab an image into the TOOLS memory.

Optionally, the GRABCENTER.C file may be modified to include the process of step 220 of FIG. 4 and recompiled, in which case step g will also implement step 220.

h. Press the PERIOD button on the DEMO tool in the Sun.

i. Use the SPARC mouse to designate the four registration pattern pixels. At this point, the system carries out step 240 of FIG. 4.

j. To perform steps 250, 260 and 270 of FIG. 4, press the ADD button on the tool. The output of the process includes the following two files:

i. GRABBED.VALS, including the intensity values of the pixels included in the pattern, uncorrected for residual aliasing; and ii. GRABBED.FIXED, including the intensity values of the pixels included in the pattern, corrected for residual aliasing.

If desired, steps f onward may be repeated for other patterns. To load other patterns, the DEMO.c file may be suitably modified to generate a new pattern.

It is appreciated that the particular embodiment described in the Appendices is intended only to provide an extremely detailed disclosure of the present invention and is not intended to be limiting. The present invention need not be implemented in software and may, instead, be implemented in dedicated hardware.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A system for inspecting a display panel comprising:
   a sensor for acquiring an image of substantially the entirety of the display panel;
   a blur generator for introducing blurring in the image of the display panel as it is acquired by the sensor, said blurring being introduced by a relative movement between the sensor and the display panel; and
   an image processor receiving an output from the sensor and being operative to identify nonuniformities in the intensities of pixels of the panel.

2. A system according to claim 1 wherein the sensor is capable for acquiring an image of the panel at a resolution which does not substantially exceed that of a standard TV camera.

3. A system according to claim 2 wherein the sensor comprises less than 1300×1000 sensing elements.

4. A system according to claim 3 wherein the sensor comprises no more than 800×500 sensing elements.

5. A system according to claim 1 wherein the display panel comprises a liquid crystal display (LCD) panel.

6. A system according to claim 1, and wherein said blur generator comprises a mechanical assembly operative to provide relative motion between the sensor and the display panel during image acquisition by the sensor.

7. A method for inspecting a display panel comprising:
   acquiring an image of substantially the entirety of a display panel with a sensor;
   blurring the image of the display panel by moving the sensor relative to the display panel as the image is being acquired; and
   processing the blurred image and identifying therefrom nonuniformities in the intensities of pixels of the panel.

8. A method according to claim 7 wherein the acquiring step comprises acquiring an image of the display panel at a resolution which does not substantially exceed that of a standard TV camera.

9. A method according to claim 8 and wherein the acquiring step employs a sensor having less than 1300×1000 sensing elements.

10. A method according to claim 8 and wherein the acquiring step employs a sensor having less than 800×500 elements.

11. A method according to claim 1 wherein the display panel comprises a liquid crystal display (LCD) panel.

12. A method according to claim 7 and wherein the blurring step employs a blur generator comprising a mechanical assembly operative to provide relative motion between the sensor and the display panel during image acquisition.

* * * * *